United States Patent [19]

Richardson et al.

[11] 4,051,958
[45] Oct. 4, 1977

[54] PALLET UNLOADING AND ORIENTING DEVICE

[75] Inventors: Bruce E. Richardson; Gerald E. Wilson; Louis A. Leseelleur; Rudy Oetliker, all of London, Canada

[73] Assignee: Labatt Breweries of Canada Limited, London, Canada

[21] Appl. No.: 661,757

[22] Filed: Feb. 26, 1976

[30] Foreign Application Priority Data
June 3, 1975   Canada ................................ 228277

[51] Int. Cl.[2] .......................................... B65G 59/08
[52] U.S. Cl. ............................ 214/8.5 C; 214/8.5 SS; 221/21; 221/221
[58] Field of Search .............. 214/8.5 R, 8.5 A, 8.5 B, 214/8.5 C, 8.5 SS, 7; 221/21, 188, 221, 297, 298

[56] References Cited

U.S. PATENT DOCUMENTS 2,517,956  8/1950  Albertoli ...................... 214/8.5 A X
3,622,024  11/1971  Grey ............................. 214/8.5 SS X Primary Examiner—Robert J. Spar
Assistant Examiner—George F. Abraham
Attorney, Agent, or Firm—Bruce H. Troxell

[57] ABSTRACT

A novel device is described for unloading and orienting articles, such as cartons, stacked in tiers on a pallet. The device includes a tiltable pallet receiver which receives a loaded pallet in horizontal position and then tilts the pallet and tiered articles thereon onto their sides with the article tiers forming a series of substantially vertical, adjacent stacks. A means is provided for intermittently advancing the pallet and tiers horizontally in a direction away from the receiver when in a tilted position towards a single tier receiver which receives a single vertical stack of tiered articles from the pallet. The tier receiver is horizontally movable for moving the received stack laterally away from the next adjacent stack and support devices are provided for securely holding the stack in the tier receiver and the next adjacent stack in the pallet during this movement of the tier receiver. Preferably, a curtain means is positioned between the pallet advancing means and the single tier receiver, said curtain means being arranged to move in a plane perpendicular to the direction of travel of the tiers and to move between an open position for transfer of a stack from the pallet to the tier receiver and a closed position adjacent a stack of articles being held in a drop position in the single tier receiver. A release means is provided for dropping a stack of articles being held in the tier receiver onto a delivery chute which delivers the articles in an upright position onto a horizontal table.

16 Claims, 7 Drawing Figures

PALLET UNLOADING AND ORIENTING DEVICE

BACKGROUND OF THIS INVENTION

1. Field of the Invention

This invention relates to a device for unloading and orienting articles stacked in tiers on a pallet.

2. Prior Art

In modern brewery bottling plants, cartons or cases of empty bottles are stacked in tiers on pallets and stored in a storage area until the bottles are to be cleaned and refilled. When the bottles are used, the entire pallet load is delivered, for example, by a forklift vehicle, to a sorting area and the individual cartons are then moved from the sorting area onto a conveyor. As the cartons travel along the conveyor, empty bottles are lifted out of the cases by means of an automatic machine and transferred onto a conveyor for delivering them to a soaker. Thus, it will be seen that the handling of empty bottles in a bottling plant is a quite highly automated operation.

There is however, one major step in this entire procedure which has not been successfully mechanized, this being the unloading of the cases of empty bottles from the pallet and placing these on a sorting table. The handtransfer of the cases of empty bottles is a very tedious and unpleasant job and is, therefore, most unpopular in a bottling plant. Moreover, there are many instances of broken cases with wet bottoms or partial bottoms and this results in frequent spilling of empty bottles during hand unloading of pallets.

BROAD DESCRIPTION OF THIS INVENTION

It is, therefore, an object of the present invention to provide a device for unloading and orienting stacked or tiered articles on a pallet without the rather haphazard delivery which is characteristic of prior devices of this type.

Thus, according to the present invention, an apparatus is provided for unloading and orienting articles stacked in tiers on a pallet, said apparatus comprising:

a. a tiltable pallet receiver having a pair of side frames, a back wall and a bottom member, said receiver being supported on a support frame by means of pivotal mountings on said support frames, whereby it can in an upright position receive a loaded pallet with the bottom member substantially horizontal and then tilt until the pallet and tiered articles are resting on their sides on the receiver back wall forming a series of substantially vertical adjacent tiers;

b. means for intermittently advancing the tilted, loaded pallet in a primarily horizontal direction;

c. a single tier receiver for receiving a substantially vertical tier of articles during an intermittent advance of said means for advancing the pallet, said tier receiver being horizontally movable for moving the received tier laterally away from the next adjacent tier;

d. clamp means for separately holding the substantially vertical tier received by the tier receiver and the adjacent vertical tier on the pallet while the tier receiver moves away from the pallet;

e. release means for dropping the tier of articles being held in the tier receiver; and f. a delivery chute for receiving the dropped tier and delivering the articles in an upright position onto a horizontal table.

The tiltable pallet receiver is a structure having a pair of side frames, a back wall and a bottom member, this receiver being supported on a support frame by means of pivotal mountings on its side frames or walls. This is arranged so that it can in an upright position receive a loaded pallet with the bottom member substantially horizontal and then tilt until the pallet and tiered or stacked articles are resting on their sides on the receiver side wall with the article tiers forming a series of substantially vertical adjacent stacks. The bottom member includes a pusher means for advancing the loaded pallet horizontally in a direction out of the receiver when in a tilted position.

The means for advancing the pallet and tiered articles to the single tier receiver may, for example, be comprised of a conveyor transfer section, which in operation receives the pallet and tiered articles resting on their sides from a pallet receiver and intermittently advances said articles in a primarily horizontal direction to the single tier receiver.

In a preferred alternative arrangement the tiltable pallet receiver is positioned immediately adjacent the single tier receiver, the bottom member of said pallet receiver being adapted to intermittently advance the loaded pallet, while resting on its side, in a horizontal plane directly to the single tier receiver.

The single tier receiver a horizontally movable for moving the received tier or stack laterally away from the next adjacent stack of the pallet. Said single tier receiver is provided with support means, preferably clamp means, for separately holding the vertical stack received by the tier receiver during this lateral movement of the tier receiver. The tier receiver also includes a release means for dropping the so-supported stack of articles in a vertically downward direction following the lateral separation of said stack from the pallet. A delivery chute is provided beneath the single tier receiver for receiving the dropped stack and delivering the articles in an upright position onto a horizontal table.

The preferred apparatus is provided with a means to assure that the vertical stack of articles in the drop position is in proper alignment and that there are no obstructions which all interfere with the free dropping of the articles. Preferably, said means is a curtain means positioned immediately before the single tier receiver and functioning in combination with a clamp means of said tier receiver. The curtain means is adapted to move in a plane perpendicular to the direction of advancement of the tiers and to move between an open position for transfer of a stack from the pallet to the tier receiver and closed position adjacent a stack of articles being held in the dropping position in the tier receiver.

DETAILED DESCRIPTION OF THE INVENTION

The tiltable pallet receiver when in an upright position has an open top and one open side and in this upright position receives a pallet loaded with cartons or other articles, conveniently from, for example, a forklift vehicle or a conveyor. The back wall of the pallet receiver in upright position may be, for example, in the form of a belted section of freely moving endless conveyor while the bottom is preferably in the form of a lift table, e.g. a scissor lift. Preferably the back wall of the pallet receiver is in the form of a smooth, sheet, steel panel. With this arrangement, after a pallet of cartons has been delivered to the pallet receiver, the receiver is tilted until the pallet and the tiered articles thereon are resting on their sides on the back wall of the receiver. In this tilted substantially horizontal position, the lift table forming the bottom of the receiver acts as a ram to push the pallet and the articles resting on their sides along the back wall portion (which now forms the bottom) out of the pallet receiver. The tilting of the receiver and the movement of the lift table can conveniently be effected by means of hydraulic cylinders. When the pallet and cartons have been completely discharged from the pallet receiver the lift table retracts and the pallet receiver returns to its upright position for reloading. In order to improve the stability of the stacks of cartons resting on their sides, it may be advantageous to position the pallet receiver on a very slight incline in the direction of travel of the cartons, e.g. about 10° to the horizontal.

In the embodiment incorporating the previously described transfer conveyor section, it may also be advantageous to position said conveyor section at an incline similar to that of the pallet receiver. The conveyor transfer section is designed to move the pallet and cases resting on their sides forward intermittently a distance equivalent to the height of each carton. In other words, the conveyor transfer section intermittently advances a single stack or tier of cartons into the adjacent single tier receiver, the advancing of the cartons and pallet along the conveyor can be conveniently accomplished by means of endless chains with projecting pusher dogs for engaging the pallet bottom. These endless chains are carried on sprockets mounted on upstanding side supports above and to each side of the conveyor belt.

The single tier receiver can be in the form of a carriage mounted for movement along horizontal tracks. The carriage has a pair of side walls or frames, a back wall and top and bottom walls together defining a compartment open at one side for receiving a substantially vertical stack of articles resting on their sides from the pallet receiver. The top of the single tier receiver includes a press plate for securely holding the stack of articles in the compartment and it may also have associated with a side thereof a further vertical press plate which applies pressure to the vertical stack in a horizontal direction. In operation, the single tier receiver moves to a position immediately adjacent the outlet side of the pallet advancing means and receives a vertical stack of articles from the pallet. The support or clamp means then engage the advanced tier after which the carriage moves along on its track away from the pallet advancing means to a position directly above the chute. The purpose of this is to create a space between the articles being held in the single tier receiver and those maintained in the pallet so that there will be no interference between the respective stacks of cartons during the drop. It is also advantageous to provide a second clamping means on the conveyor transfer section, or in the preferred alternative the pallet receiver, which will securely hold the first stack of cartons remaining in the pallet and prevent any of these cartons from accidentally falling into the space between the pallet advancing means and the single tier receiver when the latter is positioned above the chute.

In the preferred arrangement of the invention, the curtain means, provided to assure the proper alignment of the vertical stack of articles in the drop position, comes into play at this point to provide a fourth wall for the compartment in the single tier receiver and also to serve as a detector device for detecting any obstructions between the respective stacks of articles which might interfere with the smooth dropping of the vertical tier in the single tier receiver. Said curtain means comprises one or, preferably, a pair of horizontally slideable flexible panels. As these panels close, they will push loosely interlocked flaps, etc. out of the path of travel. However, if the panels encounter a major obstruction such as tightly interlocked flaps, cartons pulled out of position, etc. they stop and after a short time delay return to the open position. The single tier receiver then returns laterally to a position immediately adjacent the pallet advancing means and then back once again to the dropping position. Usually this action will serve to re-align the cartons or other articles in the single tier receiver and will usually serve to pull free any interlocking flaps. With the single tier receiver back in the dropping position, the curtains once again commence to close and, if they encounter no obstruction, they close completely and the vertical stack in the single tier receiver is dropped.

In order to drop the stack of articles being held in the single tier receiver into the chute, the bottom of the receiver is preferably in the form of a horizontally slideable tray which can be actuated by means of a hydraulic cylinder. When this tray retracts allowing a free fall of the stack of cartons the presence of the curtain serves as a fourth wall of the compartment assuring an orderly drop of the cartons onto the chute.

The chute, preferably curved, may be directly attached to the bottom of the vertical chamber so that the dropped cartons are smoothly and systematically delivered in an upright position onto a horizontal sorting area. Alternatively in a preferred arrangement the curving chute may be pivotably mounted to a vertical chute section so that is can swing between an upper position in alignment with the horizontal sorting area and a lower position on the floor, say, beneath the sorting area. With this arrangement, the chute is aligned with the sorting area while the stacks of cartons are being delivered and when all of the cartons on a pallet have been delivered and only the pallet itself remains, the chute is dropped to its lower position whereby the pallet is delivered onto the floor beneath the sorting area.

A preferred embodiment will now be illustrated by the accompanying drawings in which.

Figure 1:
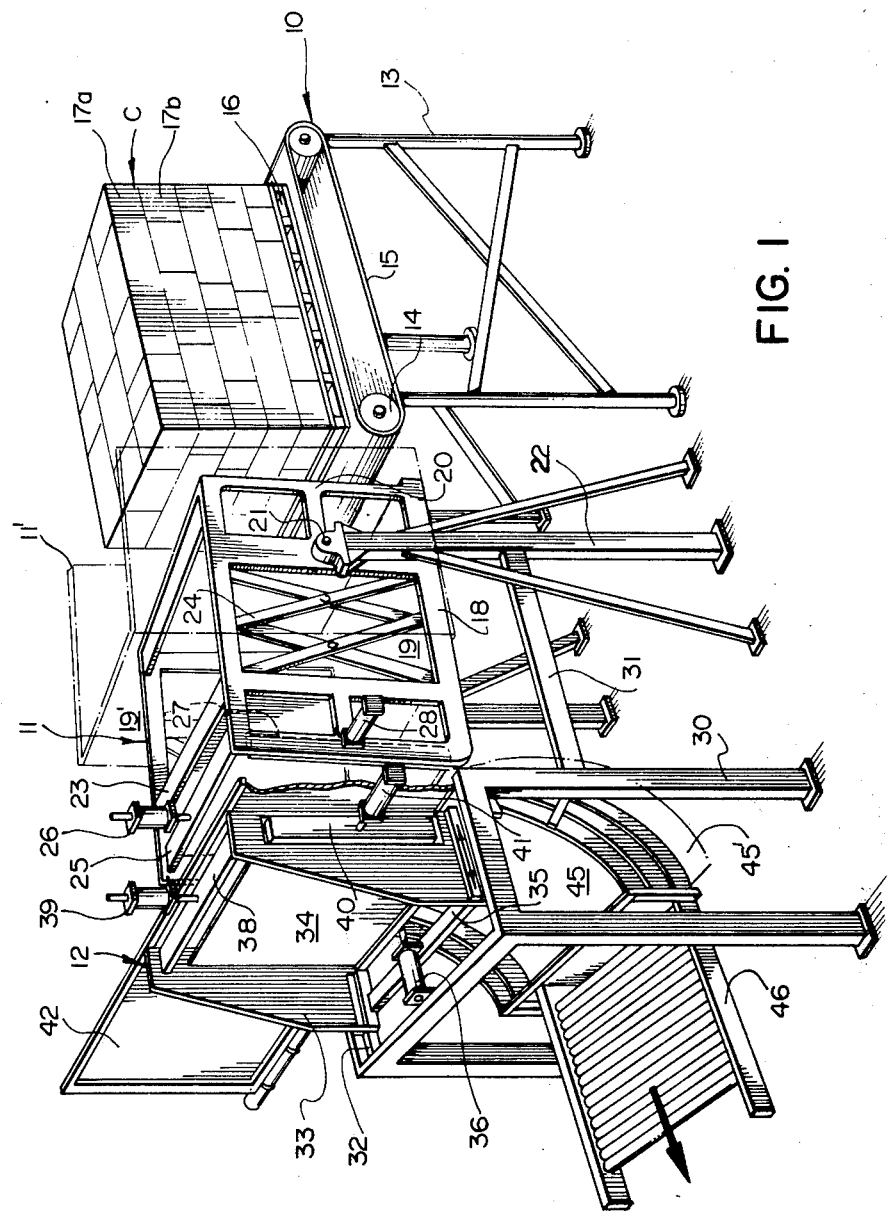
FIG. 1 is a perspective view of the present unloading and orienting device.

As illustrated in FIG. 1, the complete apparatus has the following components:

INFEED CONVEYOR

The infeed conveyor as illustrated is purely a convenience and is not essential to the present invention.

The conveyor 10 as illustrated has a support frame 13 with rollers 14 driving a conveyor belt 15 on a table. This has the convenience that a pallet 16 loaded with cartons C can be dropped on conveyor 10 by a forklift vehicle and thereby be ready for immediate delivery to the tiltable pallet receiver 11 when it is ready to receive a fresh pallet. The cartons forming the pallet resting on the conveyor are in horizontal tiers with the top tier being designated by the numeral 17a and the next adjacent tier being designated by the numeral 17.

TILTABLE PALLET RECEIVER

Figure 3:
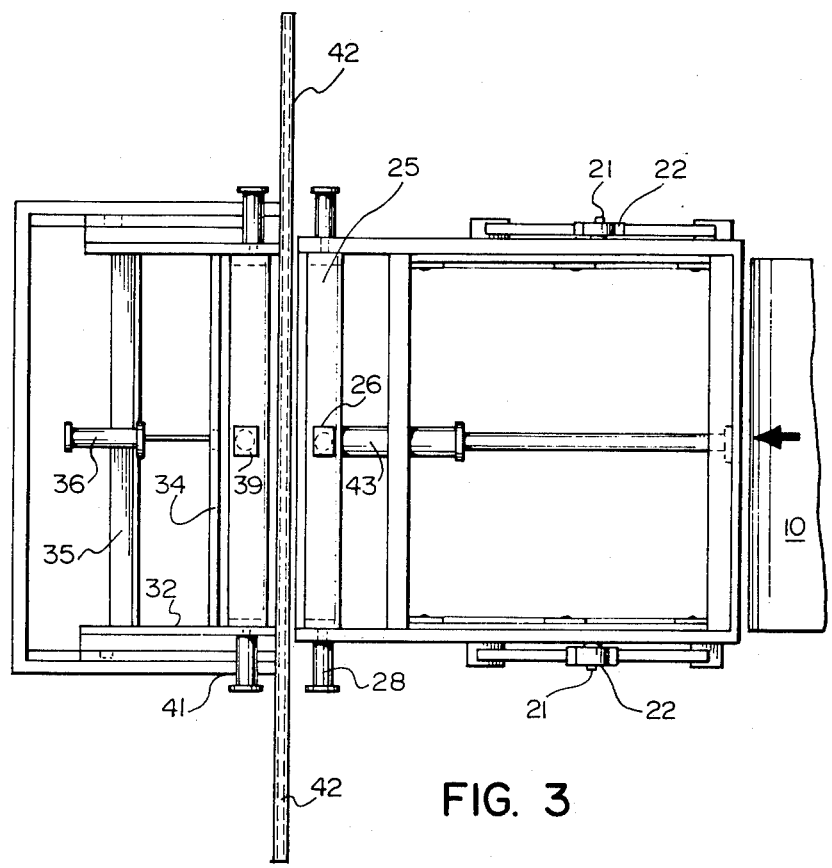
FIG. 3 is a top plan view of the device shown in FIG. 2.

The tiltable pallet receiver has a pair of side walls or frames 18 between which are mounted a smooth steel back plate 19. In the tilted position 11 as shown in solid lines in FIG. 1, the panel 19 forms the bottom wall of the pallet receiver, while in the upright position 11' shown in broken lines, this panel 19' becomes the back panel. A bottom 20 is provided for rigidity and the assembly is supported by pivot shafts 21 which are mounted in support columns 22. Mounted in this manner the pallet receiver can be tilted between the upright position 11' and the horizontal tilted position 11. This tilting of the pallet receiver is accomplished by means of an air cylinder 43, not illustrated in FIG. 1 but shown in FIG. 3.

Within the assembly 11 is a lift table 23 supported by a scissors lift 24. A suitable lift table assembly is, for example, one such as that sold under the trade mark "Blue Giant" comprising a hydraulic lift table capable of lifting two thousand pounds with cylinders and a 3.3 horsepower power-pack. This hydraulic lift table is activated intermittently to move the tilted pallet a distance sufficient to deposit a single tier into the single tier receiver 12.

At the discharge end of the pallet receiver in the tilted position is a horizontally mounted press plate 25 actuated by an air cylinder 26 and a vertically mounted press plate 27 actuated by an air cylinder 28 for firmly clamping the outmost tier in the receiver 11.

SINGLE TIER RECEIVER

Figure 2:
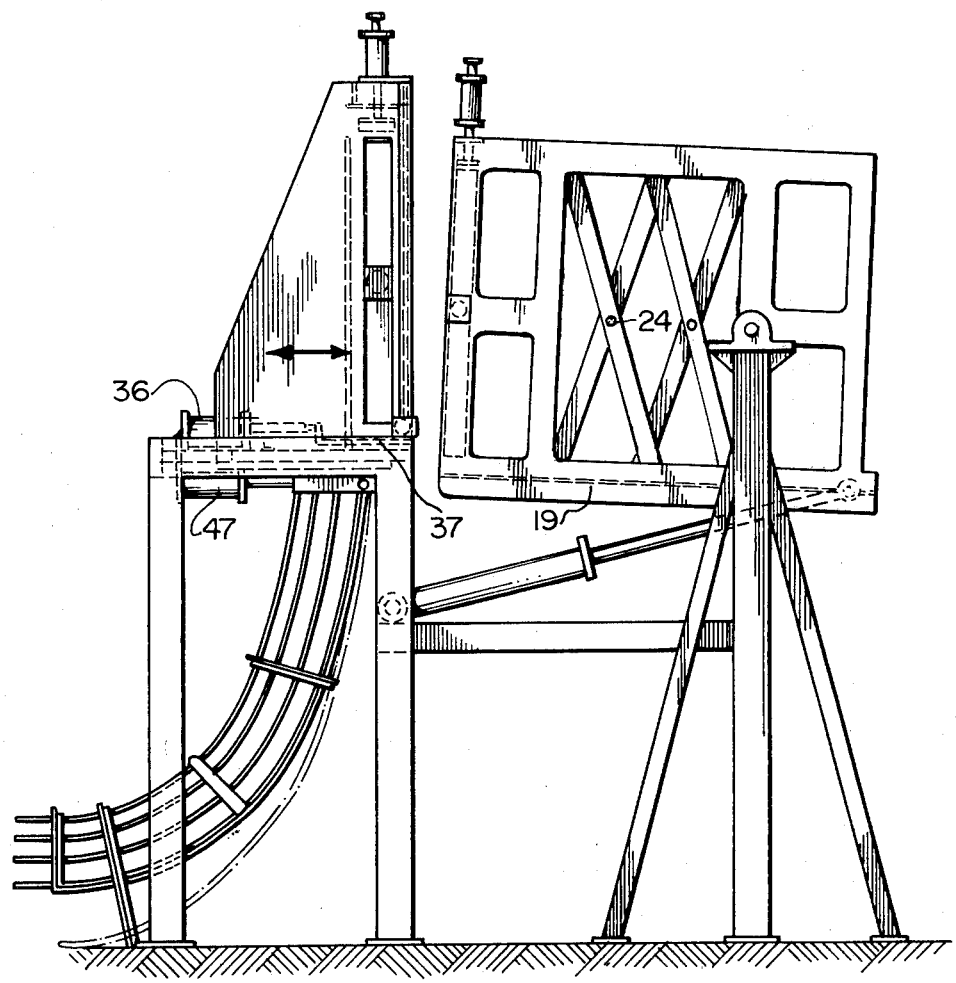
FIG. 2 is a side elevation of the device.

The single tier receiver is supported on a support frame with legs 30 and is rigidly connected to the columns 22 of the pallet receiver by means of cross-tie bars 31. The single tier receiver is in the form of a carriage which is able to travel horizontally while supported on tracks 32 on the support frame. The carriage has a pair of side walls 33 joined at the bottom by a cross bar 35. Extending across between mid regions of the side walls 33 is a back plate 34 defining the back wall of the compartment for receiving a vertical stack of cartons. The bottom of this compartment is formed by a slide plate 37 which is shown in FIG. 2 and is horizontally movable by means of air cylinder 36. The top of the compartment is defined by a clamp bar 38 which is vertically actuated by means of air cylinder 39. Also mounted through an opening in the side wall 33 is a vertical clamp bar 40 which is horizontally actuated by means of air cylinder 41. A further air cylinder 47 is mounted between cross bar 35 and the support frame for movement of the carriage along the track 32.

Positioned beneath the carriage is an incline chute 45 for receiving a dropped stack of cartons from the compartment of the single tier receiver and delivering them in an upright position onto sorting table 46. The chute 45 is pivotally mounted at its upper end and can be dropped down to the position 45' so that after the last tier of cartons has been unloaded from the pallet, the pallet itself is fed through the system and is delivered down the chute 45' beneath the sorting table.

CURTAIN

Figure 4:
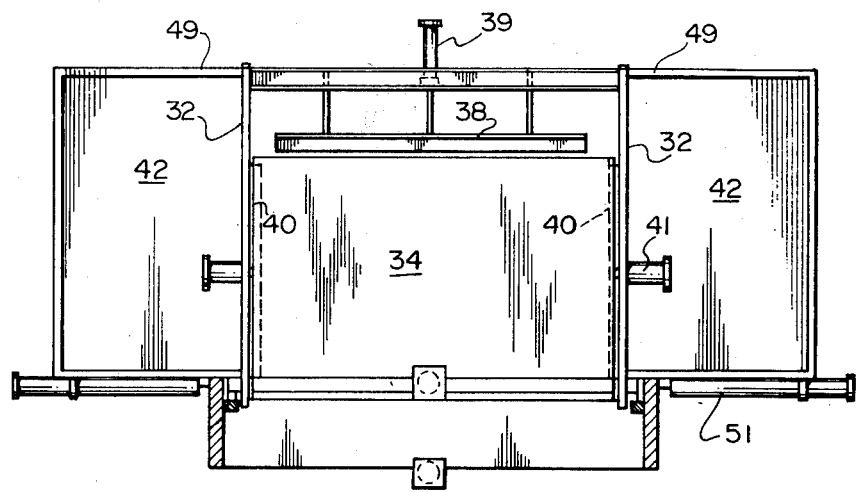
FIG. 4 is a partial end elevation of the device shown in FIG. 2.
Figure 5:
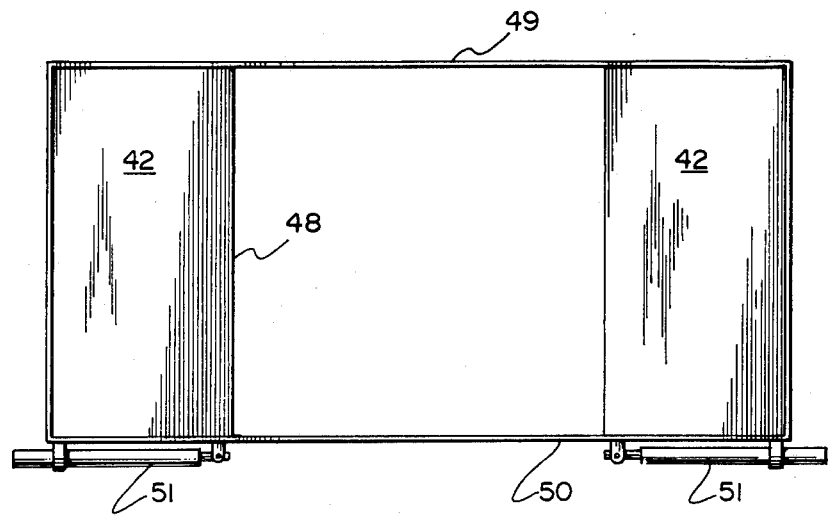
FIG. 5 is an end elevation of the curtains in the open position.
Figure 6:
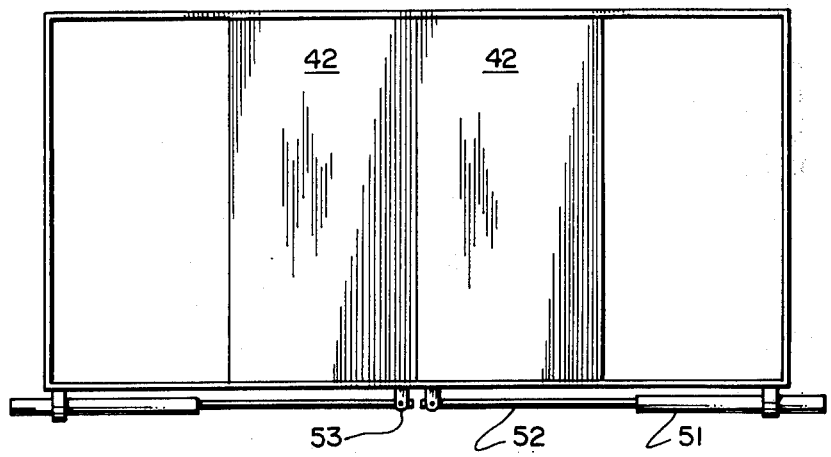
FIG. 6 is an end elevation of the curtains in the closed position.

The curtain, shown in detail in FIGS. 4, 5 and 6, is comprised of light gauge metal panels 42, e.g. 16 gauge steel, and is guided and supported by an upper track 49. The lower rims are guided in a guideway 50. Flanges 48 are provided on the inner edge of the curtains and these flanges engage the obstructions encountered by the curtains.

Small, low-power air cylinders 51 are used to drive the curtains along the track with the cylinder rods 52 being connected to the panels by connectors 53. The cylinders have sufficient power to push small obstructions out of the way but when the curtain encounters a major obstruction, the cylinder stalls.

CONTROL EQUIPMENT

The apparatus, with some simple control equipment, can be operated on a substantially automatic basis. Limit switches (not illustrated) are positioned adjacent panel 34 of the single tier receiver so that when the cylinders of the hydraulic lift table 23 are activated, they push the entire load in the pallet receiver until the foremost tier is in position in the single tier compartment, thus tripping the limit switches. This automatically disengages the cylinders of the table 23, thereby stopping any further pushing action and these limit switches also activate the air cylinders 26, 28, 39 and 41 to securely clamp the tier in the single tier receiving compartment and the first tier remaining in the pallet receiver.

The movement of the press plates into engagement with the tiers trips a further switch which activates air cylinder 47 so that carriage 12 moves to a drop position in alignment directly above the chute 45. The arrival of the carriage in this position trips a further limit switch which activates the curtain panels 42. The closing action of the curtain is controlled by a timing device so that when the cylinders 51 are activated in a closely position, the closing action is continued for a pre-determined time after which the action is reversed, whereby the panels return to the open position. If the cycle is interrupted by the curtains not closing fully, this indicates the presence of an obstruction. Incompletion of the cycle reactivates cylinder 47 causing the carriage to move back into proximity to the pallet receiver 11 and then return once again to the drop position at which time the curtain panels 42 are once again activated. The system can be arranged so that if after two or three such attempts an obstruction is still indicated, the system stops and a warning signal is turned on. This indicates that the obstruction must be manually removed so that the cycle may continue.

On the other hand, if the curtain panels meet no obstruction, they fully close, thereby tripping a limit switch which releases air cylinders 39 and 41 and activates air cylinders 36 to retract slide plate 37. In this manner a single vertical stack of cartons is dropped down chute 45 onto table 46.

When all of the cartons on the pallet have been delivered down chute 45, the pallet itself is pushed into the single tier receiving compartment. This moves the lift table 23 to position to trip a further limit switch which activates cylinders causing the chute 45 to drop down to the position 45'. The pallet itself then follows the same sequence as a single tier of cartons and is delivered out chute 45' beneath table 46. The passage of the pallet through this path trips a further switch causing retraction of the chute to position 45 and engagement of cylinder 43 to swing the pallet receiver into position 11'. This in turn activates conveyor 10 to deliver a pallet 16 into pallet receiver 11', thereby tripping a switch in the receiver 11' which stops the conveyor and activates cylinder 43 so that the loaded receiver swings to the position 11 from whence the entire cycle is automatically repeated.

Figure 7:
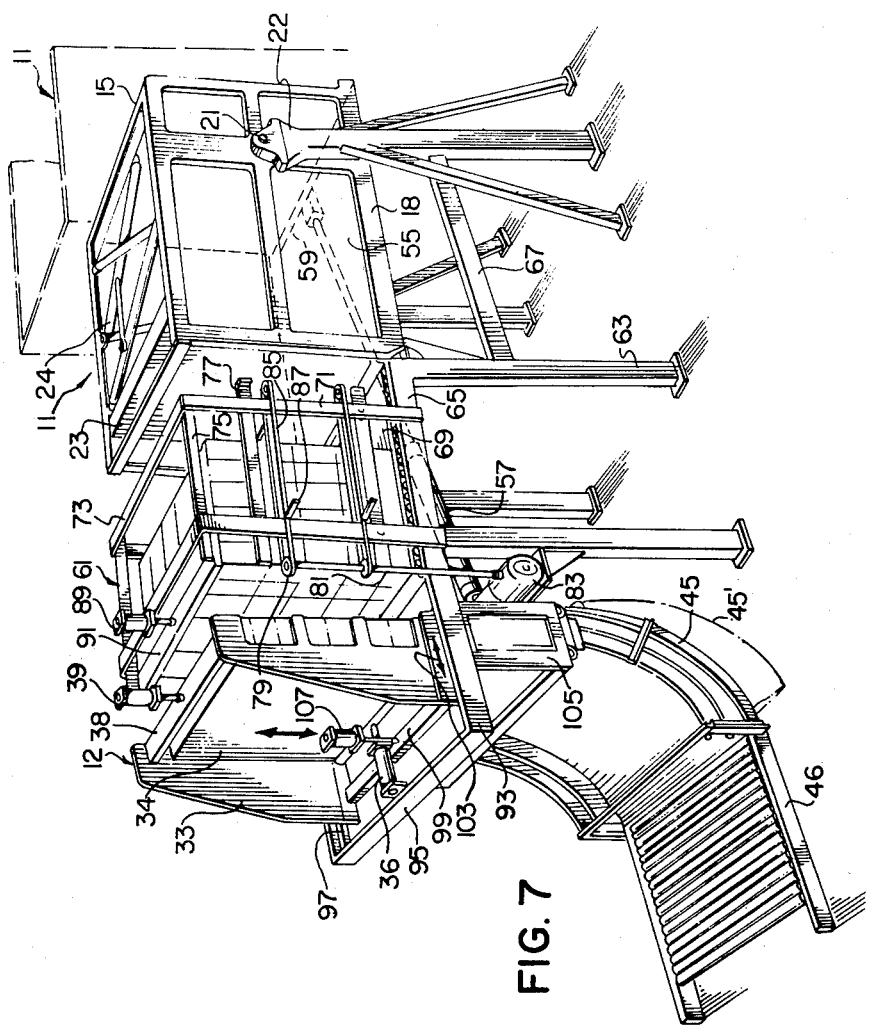
FIG. 7 is a perspective view of an alternative embodiment of the unloading and orienting device.

A less preferred alternative of the present invention is illustrated in FIG. 7, wherein the device is shown to be comprised of the following main components:

TILTABLE PALLET RECEIVER

The tiltable pallet receiver 11 is provided with a pair of side frames 18 which support therebetween a roller conveyor assembly 55, which comprises an endless belt running on rollers. Said conveyor 55 forms the bottom of the tiltable pallet receiver 11 and the backwall of the upright pallet receiver 11'. Mounted in the bottom of the receiver in its upright position 11' is a lift table 23 supported by a scissors lift 24, both of a type described hereinbefore.

The pallet receiver is supported by support columns 22 via pivot shafts 21, which allow movement of the pallet receiver between the upright position 11' and the tilted position 11 at an incline of approximately 10° to the horizontal.

The actual tilting of the pallet receiver is achieved by means of air cylinder 57, the rod of which is connected to a pivotable cross bar 59 extending between side frames 18.

CONVEYOR TRANSFER SECTION

The conveyor transfer section 61 is positioned immediately adjacent the tiltable pallet receiver 11 so that in operation said transfer section receives a pallet load of cartons from the pallet receiver, these cartons and pallet resting on their side and being pushed into the conveyor transfer section by means of the lift table 23. The transfer section is provided with four legs 63 connected to side table support beams 65 which are inclined at about 10° to the horizontal. A pair of cross-ties 67 are also provided between two of legs 63 and the support columns 22 of the tiltable pallet receiver so that the two components will be in a fixed position relative to each other. Mounted as a table between support beams 65 is a second conveyor assembly 69 of the same type as that used in the pallet receiver. An upper frame assembly is provided including upwardly extending side bars 71 connected at their bottom end to the beams 65 and connected at the top end by cross-ties 73 Additional side-tie members 75 are also connected between bars 71.

Mounted on each side of the transfer section are a pair of guide rails 77 which are resiliently mounted to beams 71 by way of spring members (not shown). These guide rails 77 serve to align the pallet and cartons moving to the conveyor section and will yield outwardly towards the beams 71 against the force of the spring members.

The conveyor transfer section has a pair of chain sprockets 79 mounted from each side of the four frame members 71. The sprockets are fixed to shafts at the rear end of the transfer section (not shown) and shafts 81 at the front end. The shafts 81 form the main drive shaft for the sprockets on each side of the transfer section and extend downwardly to a pair of double gear boxes 83. Not shown in FIG. 7, is an additional pair of shafts which extend inwardly from gear boxes 83 and connect to a central gear box driven by an electric motor.

This drive mechanism drives endless chains 85 on each of which are mounted two equally spaced pusher dogs 87.

At the upper front edge of the conveyor transfer section is mounted on air cylinder 89 which activates a press pad 91. This serves as a clamping device to securely hold the first tier of cartons in the transfer section in position.

SINGLE TIER RECEIVER

The single tier receiver 12 is supported on a pair of horizontal side beams 93 which are fixed to the ends of beams 65 of the transfer section. These side beams 93 are joined by cross beam 95 to provide a rigid base structure. The single tier receiver is in the form of a carriage arranged to travel horizontally while supported on track 97 mounted on the inner faces of the support beams 93. The side walls 33 of the carriage are connected near the lower portions by a cross-tie member 99. Stop plate 34 extends between plates 33 at an intermediate position. As viewed from FIG. 7, this stop plate 34 is positioned inwardly from the righthand edge of side walls 33 sufficiently to receive a single tier of cartons. In other words, the portion to the right of the stop plate 34 is a single tier receiving compartment. The bottom of this compartment is closed by way of a slide plate (not shown) which is movable along a horizontal axis by means of pneumatic cylinder 36. The tier of cartons is held firmly in the single tier receiving compartment by way of press pad 38 which is vertically actuated by means of air cylinder 39.

It will be appreciated that the single tier receiver carriage 12 is able to travel in a horizontal direction along its support tracks in the direction of arrow 103 between a position as shown in FIG. 7 in which the single tier receiving compartment is vertically aligned above chute 105 and a position wherein the compartment is immediately adjacent the end of the conveyor transfer section 61. An air cylinder (not shown) is connected to the carriage to effect the horizontal movement. The carriage is pivotally mounted so that by actuation of air cylinder 107 the carriage can be caused to tilt through an angle of about 10° to position the single tier receiving compartment in complete alignment with the end of the conveyor transfer section. In this position the transfer conveyor pusher dogs are actuated moving a single tier of cartons into the single tier receiving compartment. When this has been accomplished air cylinders 89 and 39 are actuated so that the first tier of cartons remaining in the transfer conveyor and the tier being held in the tier receiving compartment are firmly clamped in place. Then air cylinder 107 retracts causing the loaded carriage to tilt back to a substantially vertical position and an air cylinder (not shown) is activated to move the carriage into the position shown in FIG. 7, at which time cylinder 36 retracts, withdrawing the slide (not shown) and allowing the single tier of cartons being held in the compartment to drop down chute 45.

Between the curving chute 45 and the single tier receiver 12 is positioned a vertical drop chamber 105 for receiving the cartons dropped from the single tier holding compartment and allowing these cartons to move into the curved chute in a controlled manner. The controlled drop is accomplished by means of a pair of metering belts (not shown) arranged to contact the front and back of the dropped tier and which are inclined toward each other in a downward direction within the vertical drop chamber. Said belts are comprised of endless belts mounted on rollers which are adjustable to control the tension on the belts.

The curving chute 45 is pivotally connected to the bottom end of the decelerating drop chamber 105. In operation after the last tier of the cartons has been unloaded from the pallet the chute 45 is dropped down to the position 45' in order to allow the pallet, which is then itself fed through the system, to be delivered down the chute 45' to a location beneath the sorting table 46.

CONTROL EQUIPMENT

Through the use of relatively simple control equipment, much as described hereinbefore, the device can be operated semi-automatically. For example, the drive motor for the transfer conveyor section runs continuously with the intermittent movement of the pusher dogs 87, the movement of which is controlled by a brake-clutch device (not shown). Limit switches are positioned adjacent the stop plate 34 of the single tier receiving compartment so that when the pusher dogs 87 are activated, they push the entire load in the transfer conveyor forward until a tier is in position in the single tier compartment thereby tripping the limit switches. This disengages the clutch immediately stopping the movement of the pusher dogs 87. The limit switches in the single tier receiving compartment also activate the air cylinders 39 and 89 to securely clamp the tier in the single tier receiving compartment and the first tier remaining in the transfer conveyor section, respectively.

The downward movement of the press plate 38 into engagement with the tier trips a further switch causing release of the air cylinder 107 so that the carriage 12 can swing down from its inclined position in alignment with the transfer conveyor into a vertical position. The return of the carriage to its vertical position trips a further switch which activates an air cylinder which pushes the carriage 12 until the single tier compartment holding the load of cartons is in alignment directly above the drop chamber 105. The movement of the carriage into this position trips a limit switch causing the activation of the air cylinder 36 which retracts the slide tray (not shown) thus releasing the stack of cartons being held in the single tier compartment into the drop chamber 105.

The drop chamber may be provided with a photoelectric cell which indicates when the chamber is empty and this in turn sets off a repeat of the cycle in the reverse direction whereby the carriage returns to its position in close alignment with the transfer section and the pusher dogs are activated to deliver another vertical tier of cartons in the single tier receiver.

Once all of the cartons on the pallet have been delivered via chute 45, the pallet itself is pushed into the single tier receiving compartment. The pusher dogs 87 are of sufficient length that as they move on their support chains around sprockets 79, they push the pallet into the compartment sufficiently far to trip the limit switches. One cycle of the pusher dogs is thereby completed and the completion of the cycle trips a switch which activates an air cylinder to move the chute into its lower position 45' so that the pallet will be delivered beneath the sorting table 46.

While the automatic de-tiering sequence is being carried out, the tiltable pallet receiver may be returned to its upright position via manual controls in preparation for receiving another loaded pallet. Thereafter the pallet receiver is tilted and the next automatic de-tiering cycle may be initiated.

What is claimed is:
1. An apparatus for unloading and orienting articles stacked in tiers on a pallet comprising:
  a. a tiltable pallet receiver having a pair of side frames, a back wall and a bottom member, said receiver being supported on a support frame by means of pivotal mountings on said support frames, whereby it can in an upright position receive a loaded pallet with the bottom member substantially horizontal and then tilt until the pallet and tiered articles are resting on their sides on the receiver back wall forming a series of substantially vertical adjacent tiers;
  b. means for intermittently advancing the tilted, loaded pallet in a primarily horizontal direction;
  c. a single tier receiver for receiving a substantially vertical tier of articles during an intermittent advance of said means for advancing the pallet, said tier receiver being horizontally movable for moving the received tier laterally away from the next adjacent tier;
  d. clamp means for separately holding the substantially vertical tier received by the tier receiver and the adjacent vertical tier on the pallet while the tier receiver moves away from the pallet;
  e. release means for dropping the tier of articles being held in the tier receiver; and
  f. a delivery chute for receiving the dropped tier and delivering the articles in an upright position onto a horizontal table.

2. An apparatus according to claim 1 wherein the pallet receiver is tilted by means of an air cylinder.

3. An apparatus according to claim 2 wherein the means for intermittently advancing the pallet comprises a scissor lift table for urging the loaded pallet through the pallet receiver when in the tilted position.

4. An apparatus according to claim 2 wherein the pallet receiver back wall comprises a freely moving belt conveyor.

5. An apparatus according to claim 3 wherein the tiltable pallet receiver includes a vertically movable horizontal press plate in an upper section thereof immediately adjacent the single tier receiver which acts in combination with the back wall of said pallet receiver so that the first tier of articles remaining in the tiltable pallet receiver is held securely in place while the tier in the single tier receiver is moved laterally and thereafter dropped.

6. An apparatus according to claim 1 wherein the means for intermittently advancing the tilted, loaded pallet comprises a freely moving belt conveyor transfer section and upstanding side supports carrying endless chains with projecting pusher dogs for engaging the pallet bottom and urging the pallet and tiered articles along said belt conveyor table toward the single tier receiver.

7. An apparatus according to claim 6 wherein the conveyor transfer section includes a vertically movable horizontal clamping bar in an upper section thereof immediately adjacent the single tier receiver which acts in combination with said conveyor so that the first tier of articles remaining in the conveyor transfer section is held tightly in place while the single tier in the tier receiver is laterally displaced and thereafter dropped.

8. An apparatus according to claim 1 wherein the single tier receiver comprises a carriage mounted for movement along horizontal tracks, said carriage having a pair of side frames, a back wall, a top and a bottom defining a compartment open at one side for receiving a tier of articles from the means for intermittently advancing the tilted, loaded pallet, said top being vertically movable to act as a clamping mechanism for securely holding the stack of articles in the compartment, and said bottom means being operable for releasing the held stack into the delivery chute.

9. An apparatus according to claim 8 wherein the movable top is actuated by an air cylinder.

10. An apparatus according to claim 8 wherein the bottom comprises a horizontally slideable tray.

11. An apparatus according to claim 10 wherein the slideable tray is actuated by an air cylinder.

12. An apparatus according to claim 8 wherein a vertical chute section is positioned immediately below the single tier receiver, the delivery chute being pivotally attached to the bottom of the vertical chute section.

13. An apparatus according to claim 12 wherein the vertical chute section includes metering belts for controlling the vertical drop speed of the released stack of articles.

14. An apparatus according to claim 3 wherein curtain means is positioned between the pallet receiver and tier receiver, said curtain means being adapted to move in a plane perpendicular to the direction of advancement of the tiers and to move between an open position for transfer of a stack from the pallet receiver to the tier receiver and a closed position between the tier being held in the single teir receiver and the next adjacent tier in the pallet receiver.

15. An apparatus according to claim 14 wherein said curtain means comprises a pair of horizontally slideable panels, said panels being adapted to engage and detect any obstruction between the pallet receiver and the tier receiver.

16. An apparatus according to claim 15 wherein said panels are powered by low-power air cylinders with the closing action being controlled by a timing device, whereby the closing action is continued for a pre-set period of time after which the panels return to the open position.

* * * * *